United States Patent [19]
Kauffman

[11] Patent Number: 4,710,955
[45] Date of Patent: Dec. 1, 1987

[54] CABLE TELEVISION SYSTEM WITH TWO-WAY TELEPHONE COMMUNICATION PATH

[75] Inventor: Marc W. Kauffman, Cheltenham, Pa.

[73] Assignee: General Instrument Corporation, New York, N.Y.

[21] Appl. No.: 801,574

[22] Filed: Nov. 25, 1985

[51] Int. Cl.$^4$ .................. H04N 7/167; H04N 7/10; H04M 11/00

[52] U.S. Cl. .................... 380/10; 235/382; 235/382.5; 358/84; 379/91; 379/92; 379/209; 380/20; 455/2

[58] Field of Search .............. 358/122, 84, 86, 114; 179/2 AS, 2 AM; 455/2, 4; 235/382, 382.5; 380/10, 20; 379/91, 92, 209

[56] References Cited

U.S. PATENT DOCUMENTS

| | | | |
|---|---|---|---|
| 3,390,234 | 6/1968 | Glidden | 179/2 AM |
| 3,684,823 | 8/1972 | McVoy | 358/84 |
| 3,769,579 | 10/1973 | Harney | 358/84 |
| 3,890,461 | 6/1975 | Vogelman et al. | 358/115 |
| 4,104,486 | 8/1978 | Martin et al. | 179/2 AM |
| 4,126,762 | 11/1978 | Martin et al. | 179/2 A |
| 4,163,254 | 7/1979 | Block et al. | 358/122 |
| 4,225,884 | 9/1980 | Block et al. | 358/84 |
| 4,439,670 | 3/1984 | Basset et al. | 235/382.5 |
| 4,484,217 | 11/1984 | Block et al. | 358/84 |
| 4,486,625 | 12/1984 | Reinauer et al. | 179/2 AM |
| 4,546,382 | 10/1985 | McKenna et al. | 358/86 |

Primary Examiner—Stephen C. Buczinski
Attorney, Agent, or Firm—Barry R. Lipsitz

[57] ABSTRACT

A method and apparatus to enable billing of subscribers of pay-per-view television systems or the like on a non-real-time basis. A scrambled television signal is received at a subscriber terminal from a headend. The received signal is selectively descrambled in response to subscriber action indicating acceptance for viewing of a program contained in the signal. A record is maintained at the subscriber terminal of the billable programs accepted for viewing by the subscriber. The signal received from the headend is monitored by the subscriber terminal for a call-in command which instructs the subscriber terminal to forward the record of billable programs to the headend. A telephone communication path is established between the subscriber terminal and the headend in response to the call-in command. The record of billable programs is transmitted to the headend over the telephone communication path, and the subscriber is billed in accordance therewith. A plurality of transaction credits can be downloaded from the headend to the subscriber terminal, stored therein, and debited in response to the acceptance by a subscriber of a billable program for viewing. The descrambling of a program is prevented if there are not sufficient stored transaction credits available to pay for the program. A time-out count can be maintained in the subscriber terminal and reinitialized in response to a signal received from the headend. Descrambling of billable programs is prevented at the subscriber terminal if the time-out count expires.

32 Claims, 7 Drawing Figures

CABLE TELEVISION SYSTEM WITH TWO-WAY TELEPHONE COMMUNICATION PATH

BACKGROUND OF THE INVENTION

The present invention relates to cable television systems, and more particularly to a method and apparatus for providing impulse pay-per-view service and the like on a one-way cable television system.

Interest in pay-per-view programming for cable television is on the rise, and cable system operators are becoming more aware of the need for an efficient and reliable program ordering mechanism. Pay-per-view service enables a cable television customer the opportunity to select specific programs, such as first-run movies, sporting events, and special presentations for viewing at a special fee over and above the standard monthly cable television charges. Pay-per-view services can also be provided to customers of satellite television networks and the like. In the present application, all references to "cable television" will be understood to also cover all other types of television and/or data broadcasting wherein a user can choose from various program offerings or other transactions (e.g., shop at home, bank at home, etc.).

It has been determined that the peak ordering periods for pay-per-view programs occur in the last few minutes before a program begins. Thus, an effective pay-per-view system must allow a large number of subscribers to order on an impulse basis at the last minute. A number of technologies have been developed to allow subscribers to purchase program material on a pay-per-view basis. They do not adequately fill the need, however, for an economical system that enables true impulse ordering.

In a conventional one-way addressable system, pay-per-view programs have been accommodated in the past by enabling a viewer to order a program in advance of the "event" by telephoning a customer service representative employed by the cable system operator. In such systems, the customer service representative enters the program selection into a billing computer, which then forwards the request to the headend computer ("addressable controller") for authorizing the viewer's converter to receive the program. Program authorization data is transmitted by the headend over the RF cable which also carries the television signals one-way to the viewer's converter. This approach requires subscribers to order pay-per-view programs significantly in advance of the event, and it may require a significant staff of customer service representatives to handle a large volume of incoming orders.

Two-way cable television systems are known which can be used to provide pay-per-view service. Subscribers in such two-way systems enter purchase requests into a device in their home and the order is executed automatically. These two-way cable systems utilize the return RF path provided by the two-way cable television distribution system. Program ordering information is forwarded to the cable television headend system through the return RF path of the cable, and the headend checks the creditworthiness of the subscriber, records the purchase, and forwards an authorization to the converter over the cable. This process can be time consuming and, in the case of a large system, results in the need to order the program in advance. If the headend control system is down, or there is noise or other distortion in the return spectrum during a broadcast, potential customers will be lost.

Other attempts at providing pay-per-view service have focused around the use of a telephone return path. For example, voice response systems are known which utilize a computer at the headend to answer calls placed by subscribers. A series of questions are asked of the caller via synthesized or taped verbal cues. The subscriber responds to the queries by entering codes using the touchtone keypad on his telephone, or a tone generating device if a rotary phone is the only available instrument.

It is estimated that a purchase session with such a voice response system requires a connection time that averages between 60 and 90 seconds. When multiplied by many subscribers, this represents a serious limitation to the volume of traffic such a system can handle. In addition, a voice response system requires a significant capital outlay for headend equipment, phone lines, and touchtone devices for subscribers lacking touchtone service.

Auto-dial devices are also known which allow subscribers to order programs by entering information into a terminal connected to the subscriber's telephone line. The process of communicating with the headend computer is handled by a microprocessor in the subscriber's terminal. Once an order has been phoned in, the customer's credit is checked and a record is established for invoicing. The headend addressable controller then downloads the appropriate authorization over the one-way addressable system. Call duration, including connect/disconnect and line recovery for such a system is estimated at 15 seconds. This again represents a serious bottleneck when extended to a reasonably sized subscriber base. If a large number of telephone lines are used, the bottleneck will then shift to credit verification, order recording, and converter authorization stages. Such an auto-dial system requires substantial capital outlay for equipment at the headend and for subscriber equipment.

All of the systems described require the establishment of a closed-loop communication link between the subscriber and the headend computer system *before* a subscriber can view a pay-per-view program. The transaction time is not instantaneous and closed-loop communication for order processing is required for each participating subscriber. It is not unreasonable to expect that with a substantial subscriber base, subscribers will have to order programs well in advance of the event to guarantee sufficient time for processing and communication of program authorization. Such systems further demand that the entire ordering system be operational prior to the program, or potential orders will be lost. A last minute equipment or communication link failure will result in lost revenue opportunity and frustrated subscribers.

In order to overcome the limitations of the real-time ordering systems described above, the present invention provides a pay-per-view technology referred to as "store and forward". This ordering system provides an effective solution to the operational problems associated with traffic bottlenecks caused by peak order loads. The store and forward technology poses no limits to the number of subscribers that can order an event and provides instantaneous program authorization for immediate subscriber viewing.

In the system of the present invention, subscribers' cable television converters are pre-loaded with purchase credits against which pay-per-view programs can be ordered. The subscriber orders a pay-per-view program by entering a secret personal identification code, either directly on the converter or using a remote control. If the subscriber has sufficient credit, he receives instant authorization to view the program. The converter is not required to communicate with the headend system until later. At the time a program is purchased, a program identifier and time stamp is stored in the converter's non-volatile memory. Later, on a non-real-time basis, the addressable controller at the headend collects the program purchase information from the converters for subsequent billing.

In the system of the present invention, every subscriber can order an event up to the last minute for a showing, or even during the first minutes of a program depending on the cut-off ordering time determined by the cable operator. In this way, consumers are able to purchase programs on a true impulse basis. The system of the present invention is the only scheme known that does not require real-time communication and data processing in order to provide pay-per-view service.

The present invention enables implementation of impulse pay-per-view service without incurring the cost of installing and maintaining a two-way cable television distribution plant. The system uses a well-known addressable cable television system for one-way control functions sent to a subscriber's converter from the headend. The public switched telephone network is used as a return reporting path for collection of billing information related to purchases made through the subscriber terminal. Purchase reporting occurs automatically, and does not require any specific action on the part of the subscriber. The system does not impose restrictions on the normal use of the telephone by the subscriber, and does not exhibit signs of its action (e.g., ringing of the telephone). There is no need for a cable system operator to convert from a one-way to a two-way cable television system.

SUMMARY OF THE INVENTION

In accordance with the present invention, addressable cable television converter apparatus provides impulse pay-per-view service on a cable television system. The apparatus comprises means for receiving a band of signals including scrambled television program signals from a cable television network. Data retrieval means coupled to the receiving means retrieves data superimposed with the band of signals. Microprocessor means coupled to the data retrieval means processes data retrieved from the band of signals. Tuner means, operatively associated with the microprocessor, enables a user to select and receive a pay-per-view program. Memory means coupled to the microprocessor stores data indicative of pay-per-view programs selected by a user. Modem means interfaces the microprocessor to a telephone line. Auto-dial means coupled to the microprocessor dials a telephone number in response to instructions received by the microprocessor from the cable television system headend. The auto-dial means thereby establishes a telephone communication path over which the microprocessor can communicate with a remote headend computer via the modem. Means are operatively associated with the microprocessor for forwarding pay-per-view program data stored in the memory means to the headend computer via the telephone communication path established by the auto-dial means.

The apparatus can further comprise means for clearing the memory means upon receipt by the microprocessor of a reset signal from the headend. Timer means associated with the microprocessor can determine the time period during which data indicative of a pay-per-view program is stored in the memory means without being cleared. If the time period exceeds a predetermined limit, further receipt of pay-per-view programs by the subscriber is inhibited.

Each converter can store a unique identification code which is transmitted to the headend via the telephone communication path established by the auto-dial means. In this manner, the headend will know the identity of each converter as it calls in with pay-per-view program billing information.

Various operational parameters can be downloaded from the headend to each subscriber's converter via the cable television network. Pay-per-view program credits can also be downloaded from the cable television network and stored in the converter. The stored program credits are debited in response to the selection of a pay-per-view program by a user. Means operatively associated with the microprocessor inhibits the receipt of a pay-per-view program if sufficient stored program credits are not available upon selection of the program.

Means can further be provided for detecting if the auto-dial means fails in an attempt to establish a telephone communication path. The auto-dial means is actuated to make an additional attempt to establish a telephone communication path if a failed attempt is detected. The auto-dial means can be inhibited from establishing a telephone communication path if the memory means does not contain any data indicative of pay-per-view programs selected.

Auto-dial means in accordance with the present invention is coupled to a user's telephone line. The auto-dial means seizes the user's telephone line and dials thereon the telephone number of the headend computer. Means are provided for detecting an incoming ring signal on the user's telephone line, and for preventing the auto-dial means from seizing the user's telephone line and dialing a telephone number if an incoming ring signal is detected. Further, means can be provided for determining when the user's telephone line is in use. If the telephone line is already in use, the auto-dial means is prevented from seizing the telephone line and dialing a telephone number.

In a preferred embodiment, the auto-dial means utilizes pulse dialing and includes means for sensing an off-hook condition on the user's telephone line when the auto-dial means is in the process of dialing and the pulse dialing cycle is momentarily in an on-hook condition. If an off-hook condition is detected by the sensing means, the dialing process is aborted and the user's telephone line is released. After completing the dialing of a telephone number and before establishing a telephone communication path with the headend computer, the auto-dial means can flash on-hook and release the user's telephone line if an off-hook condition is sensed during the on-hook flash. This will enable the user to have priority in use of his telephone line should he attempt to make a call while the auto-dial means is attempting to establish a communication path.

The auto-dial means can further comprise means for detecting errors in data being received over a telephone communication path it establishes, and means for aborting the telephone communication path and releasing the user's telephone line if the quantity of errors detected rises above a predetermined level indicative that a user is trying to use his telephone to place a call. All communications between the converter and the headend over the telephone communication path can be encrypted using an encryption key downloaded from the cable television network via the RF cable path.

Headend apparatus is provided in accordance with the present invention for enabling impulse pay-per-view cable television service. The headend apparatus comprises a cable television transmitter and a headend controller for generating data signals containing telephone call-in instructions for each of a plurality of cable television converters. Means are provided for superimposing data signals from the controller means onto television signals output from the transmitter. A modem couples the controller means to communicate with a plurality of cable television converters calling in via a telephone network in response to telephone call-in instructions transmitted by the transmitter. In this manner, two-way communication between the headend and a plurality of cable television converters can take place over a telephone network.

The headend apparatus can comprise a plurality of modems for coupling to a plurality of telephone lines configured in a hunting arrangement. In this manner, the contention characteristics of the public telephone network are advantageously relied on to handle contention between competing converters attempting to communicate with the headend. If a particular converter gets a busy signal when it tries to telephone the headend, it aborts and tries again.

The controller means of the headend apparatus can interrogate cable television converters that have called in to obtain billing data indicative of pay-per-view programs received by the converters. The controller means can further comprise means for successively directing different groups of converters to call-in for interrogation.

In addition, the controller means can provide means for storing billing data retrieved from converters for use in subsequent billing of subscribers for pay-per-view programs that were ordered.

The headend can also include means for detecting a power failure that impedes the operation thereof. In the event a power failure is detected, billing data stored prior to the outage is maintained, and after power is restored, the same group of converters is again directed to call-in for interrogation to recover the remaining data not previously collected.

The apparatus disclosed herein can be used to provide remote transaction services other than pay-per-view cable television. For example, shop at home, bank at home, and similar services can be handled on an impulse basis in accordance with the present invention.

DETAILED DESCRIPTION OF THE INVENTION

The present invention provides a system for allowing subscribers to purchase program material on an impulse basis for immediate viewing on a television set. Subscribers are billed for purchases at the end of a billing period, and reporting of purchases occurs automatically without the need for any specific action on the part of the subscriber. The subscriber's telephone line is used for reporting purchases to the operator of the pay-per-view system.

Figure 1:
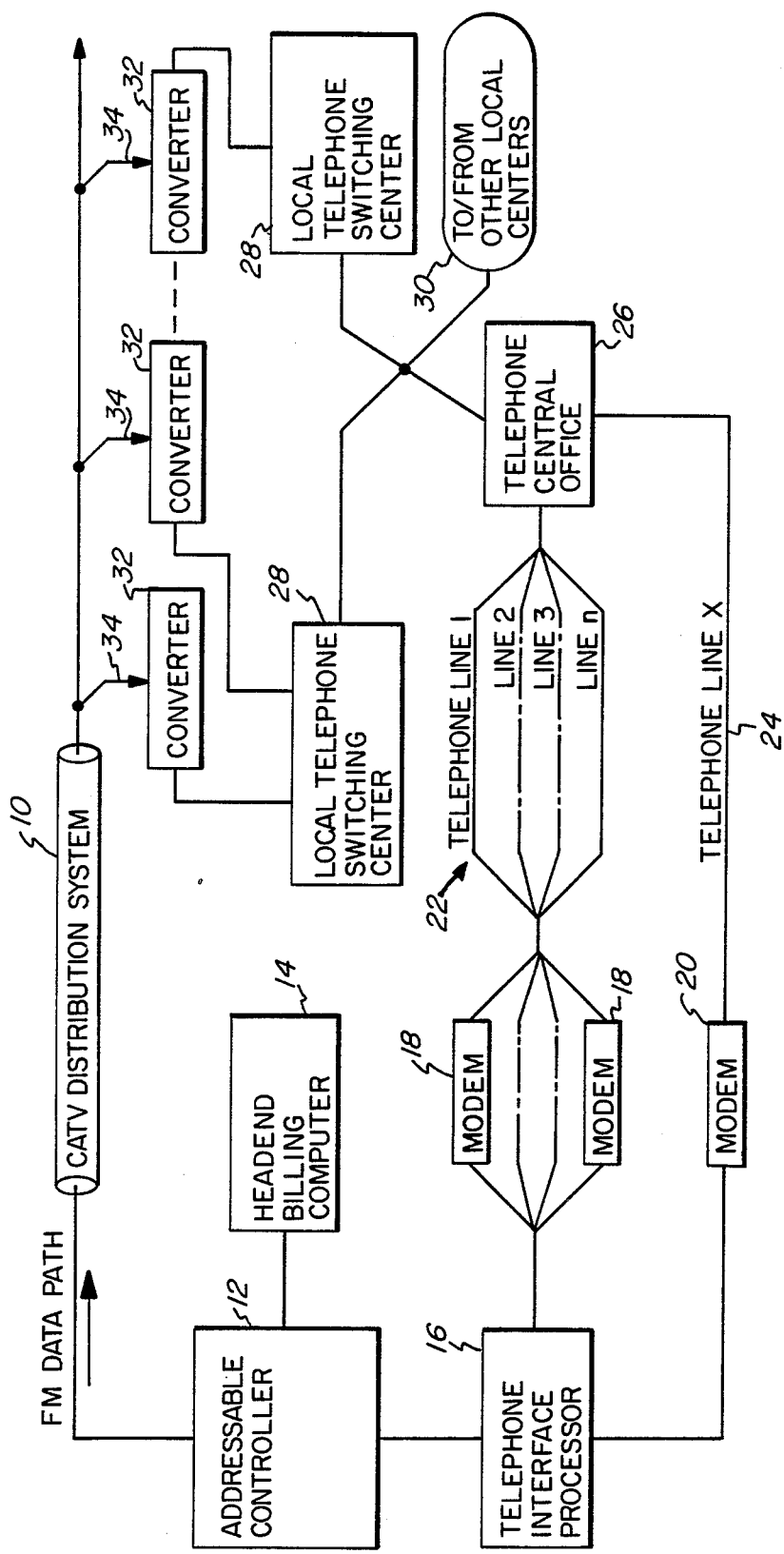
FIG. 1 is a block diagram of a cable television system providing impulse pay-per-view service in accordance with the present invention.

FIG. 1 illustrates the system architecture which uses a telephone link for return reporting of billing information to a cable television system headend. The headend distributes a cable television signal via a conventional distribution system 10. Television signals from the headend are transmitted via distribution system 10 to a plurality of subscriber terminals or converters 32 which are attached to the distribution system via cables 34. Converters 32 process the television signals and enable subscribers to tune into any of a plurality of stations carried on the cable in a conventional manner. Converters 32 also descramble premium channels which are authorized for viewing by th subscribers.

In addition to carrying television signals, the cable television (CATV) distribution system also carries data from the headend to the converters 32. Data is modulated on the cable using well-known techniques, such as frequency modulation (FM). Data transmitted over the cable system is received by specific converters 32 to which it is addressed, and is processed to execute various commands forwarded to the converters by the headend. In addition, operational parameters for the converters are downloaded from the headend via the FM data path.

Headend apparatus in accordance with the present invention includes an addressable controller 12 which generates commands in the form of data that are transmitted to individual converters 32 via an FM data path in the CATV distribution system 10. A primary function of addressable controller 12 is to collect impulse pay-per-view purchase records from subscriber converters 32 and report them to a headend billing computer 14 for invoice preparation.

Addressable controller 12 addresses groups of converters 32 via the CATV distribution system 10 and instructs the converters to call in to the headend with records of pay-per-view purchases made by the user of the converter. The adressable controller also downloads various initialization data and operational parameters to the various converters 32.

During initialization, each converter is given a telephone number to dial when commanded to call in. When the addressable controller 12 commands a group of converters to call in, a record of the subscriber identification codes assigned to the converters in the group is stored for retrieval if re-polling of the group is necessary (e.g., in the case of a power outage during a collection cycle). Addressable controller 12 includes a password and an encryption key with the command to dial sent to each converter. Both the password and encryption key are random numbers generated by the addressable controller. In a preferred embodiment, a new password and encryption key are generated for each collection cycle. Prior to transmission over the FM data stream, the password and encryption key are themselves encrypted using the converter's signature as a key. The signature is a random number, generated by the addressable controller, and downloaded to the converter during initialization. Once transmitted to the converter, it is not retransmitted in normal operation.

The headend also includes a telephone interface processor 16 which is responsible for communicating with converters 32 via public telephone lines to collect billing data on a non-real-time basis. Before initiating a collection cycle, the addressable controller 12 transfers the new password and encryption key it generates to the telephone interface processor 16.

Converters 32, in response to a command to call in from addressable controller 12 via the CATv distribution system 10, dial the appropriate telephone number to connect them to telephone interface processor 16. The telephone communication paths established by converters 32 in response to a call-in command are routed through local telephone switching centers 28 to the telephone company central office 26 that services the headend. Other converters are coupled to the telephone central office 26 via other local centers designated by box 30 in FIG. 1.

Telephone central office 26 is coupled to telephone interface processor 16 via a plurality of telephone lines 22 and a group of auto-answer modems 18. A modem 18 is provided for each of the telephone lines 22. Telephone lines 22 are arranged in a hunting order, so that all of the converters 32 commanded to call in can dial the same telephone number. The telephone central office equipment will automatically transfer the call to the next available line if the main telephone number is busy.

Incoming calls are automatically answered by the auto-answer modems 18. When the telephone interface processor 16 detects an incoming call on a line, it initiates communication with the converter calling in, sends the current password to the converter, and requests the converter calling in to send its subscriber identification code via the telephone communication path. If the password received by the converter corresponds to that previously sent to the converter by addressable controller 12 at the beginning of the billing cycle, collection of billing information will proceed after the converter's subscriber identification code is successfully received by the telephone interface processor 16. If a valid subscriber identification cannot be established within a given number of re-tries, or the password received by the converter from the telephone interface processor does not match the password previously received from the addressable controller 12, the call is terminated and the auto-answer modem 18 is commanded to go back on-hook in preparation for the next call from a converter.

Converters that cannot get through to telephone interface processor 16 because all lines were busy will re-dial on a regular basis. The time between re-dial attempts can be established by an operational parameter downloaded from addressable controller 12 to the converters during initialization. When no calls are received by telephone interface processor 16 for a given period of time established by addressable controller 12, the telephone interface processor assumes that all terminals in the current call-in group have reported. At this time, addressable controller 12 is signalled by telephone interface processor 16 to upload the billing records collected and initiate the next call-in cycle. Telephone interface processor 16 stores the collected billing data and status indicators in non-volatile memory. In the event of a power failure during collection, addressable controller 12 will, upon power-up, collect all data from telephone interface processor 16 and reinitiate the billing cycle that was in progress when the power outage occurred. This will ensure that no billing data is lost due to a power failure.

An additional telephone line 24 with a phone number different from that used to collect billing records can be provided for use in interrogation of converters for remote diagnostic purposes or security investigations. Such off-line interrogation of a converter is initiated when a headend operator manually requests a connection with a particular converter. Addressable controller 12 will download the telephone number of telephone line 24 to the converter over the FM data link together with a call-in command. At the same time, addressable controller 12 informs telephone interface processor 16 that a connection is to be established, along with data defining the subscriber identification code of the converter, the new password, encryption key, and phone port on which to expect the call. When a connection has been established via modem 20, the addressable controller 12 commands the telephone interface processor 16 to request specific data from the converter, which is communicated back to addressable controller 12 for output to the system operator. When the connection is to be terminated, addressable controller 12 downloads the primary telephone number (for billing record collection) to the converter through the telephone interface processor 16, and the download is verified. The connection is then terminated by commanding the converter to go back on-hook.

Figure 2:
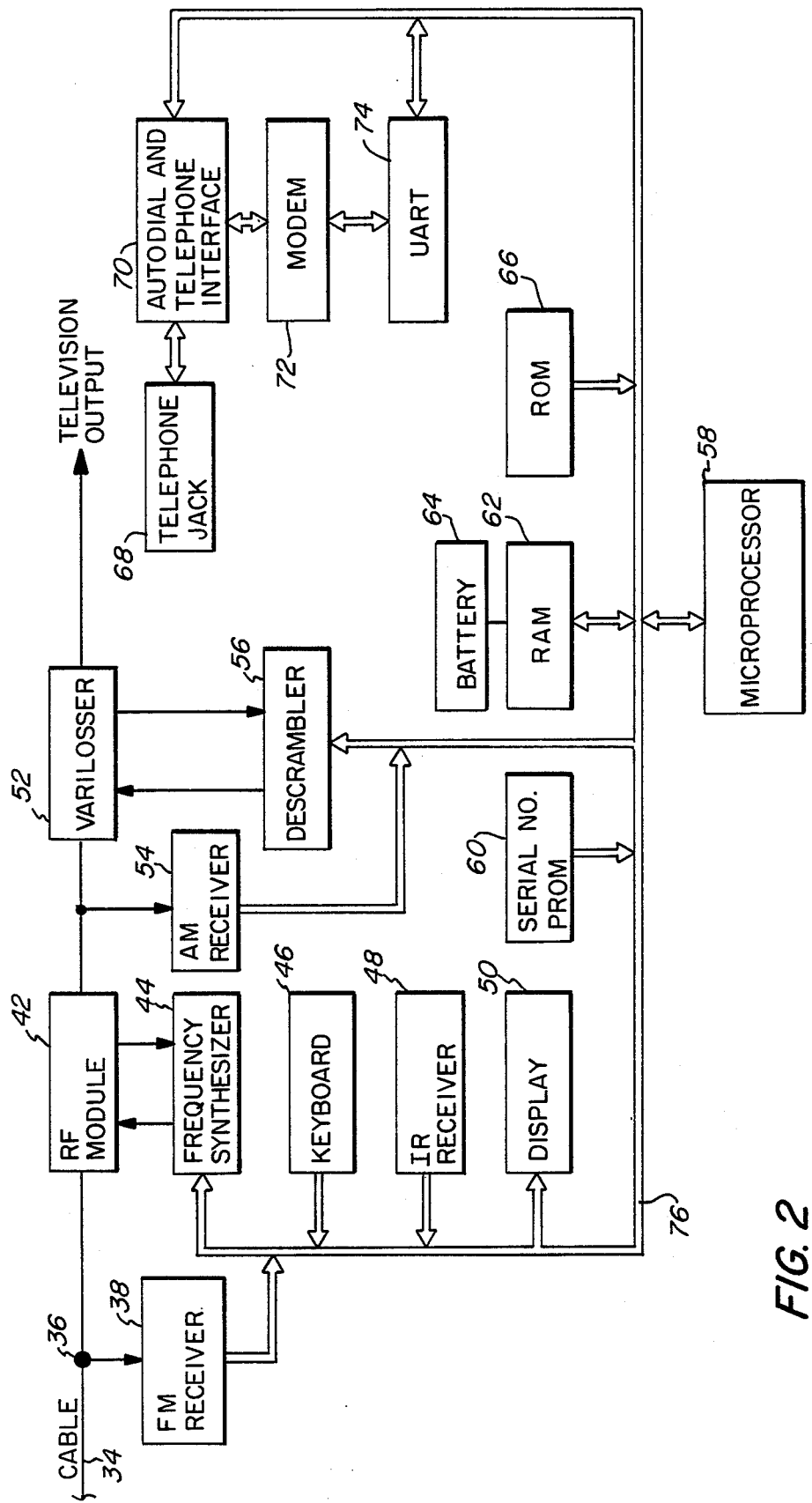
FIG. 2 is a block diagram of the converter apparatus for use in the cable television system of FIG. 1.

FIG. 2 is a block diagram illustrating the hardware components of the converters 32. Each converter is coupled to the cable television network via a cable 34 connected to an input connector 36. An FM receiver 38 detects control signals sent along the cable by addressable controller 12 via a standard addressable FM data path (e.g., at 106.5 MHz using FSK modulation at 13,985 bits per second). Those skilled in the art will recognize that other data transmission schemes can alternately be used for communicating data from addressable controller 12 to the converters 32 via the CATV distribution system.

The output of FM receiver 38 is tied into data and address bus 76 which provides data communication between a microprocessor 58 and the other components of the converter.

When the converter is installed in the cable television system, it is void of operating parameters. Addressable controller 12 downloads operating parameters for the converter via a series of one-way commands over the FM data path. Downloaded parameters are stored in random access memory (RAM) 62 which is backed up with a battery 64. Thus, once the parameters are stored in the converter, they require no cyclical updating unless a change is required. Data downloaded to the converter during initialization includes configuration information, the logical address of the converter, and a system site code which is used to disable converters that are illegally transferred from one cable system to another. Also downloaded is a data stream time-out parameter which is used as a security measure to prevent illegal disruption of the addressable communication paths.

The converter will time-out if it does not detect a keep-alive sequence within a given time period. The time-out parameter tells the converter how long to wait before timing-out. When the terminal times-out, it deauthorizes all pay services and will not accept new authorization or connect commands from the headend. The time-out feature is described in more detail below in connection with the flowcharts of FIGS. 3, 4A and 4B.

Addressable controller 12 also downloads a credit limit to each converter specifying the number of purchases the subscriber using the converter is entitled to make. In addition, a telephone number is downloaded to each converter during initialization. This number is used to establish a telephone communication path with telephone interface processor 16 for reporting billing information. Together with the telephone number, parameters are downloaded which dictate the time to allow between telephone call re-tries, and the time to allow before declaring a telephone communication path to be faulty (e.g., no carrier detected or no valid commands received from the headend). Further, data will be downloaded to the converters during initialization and on an ongoing basis to indicate which services are and are not authorized for viewing by the converter.

Once initialized, a converter can be used to selectively receive cable television programs for viewing on a subscriber's television set. An RF module 42 receives the television signals from cable 34 via input connector 36. Tuning is accomplished using a keyboard 46 which tunes a frequency synthesizer 44 via signals transmitted back and forth on data and address bus 76 by microprocessor 58. An infrared receiver 48 coupled to microprocessor 58 via data and address bus 76 enables a subscriber to access the converter via a hand-held remote control. A display 50 coupled to microprocessor 58 via data and address bus 76 provides a visual output to the subscriber identifying the channel to which the converter is tuned.

When authorized, scrambled programs are descrambled by descrambler 56 which is coupled to microprocessor 58 via the data and address bus 76. Program specific signals are detected by an AM receiver 54 at the output of RF module 42, which forwards the data signals to microprocessor 58 via the data and address bus 76. A varilosser 52 coupled to descrambler 56 and the output of RF module 42 reinjects the synchronization signals in the television signals to descramble the program as it is output to the subscriber's television.

A serial number for the converter is stored in serial number prom 60 coupled to data and address bus 76. The operating system for the microprocessor 58 together with fixed operating parameters are stored in read-only memory 66.

In accordance with the present invention, the converter also includes components to enable it to establish a telephone communication path with the telephone interface processor 16 at the cable system headend. The converter is coupled to the subscriber's telephone line via telephone jack 68. An auto-dial and telephone interface circuit 70 is provided to dial the telephone number of the headend in accordance with instructions received by microprocessor 58 from addressable controller 12 via FM receiver 38. A modem 72 and universal asynchronous receiver transmitter (UART) 74 provide for data communications between telephone interface processor 16 and microprocessor 58 via a telephone communication path established by auto-dial and telephone interface circuitry 70.

Figure 3:
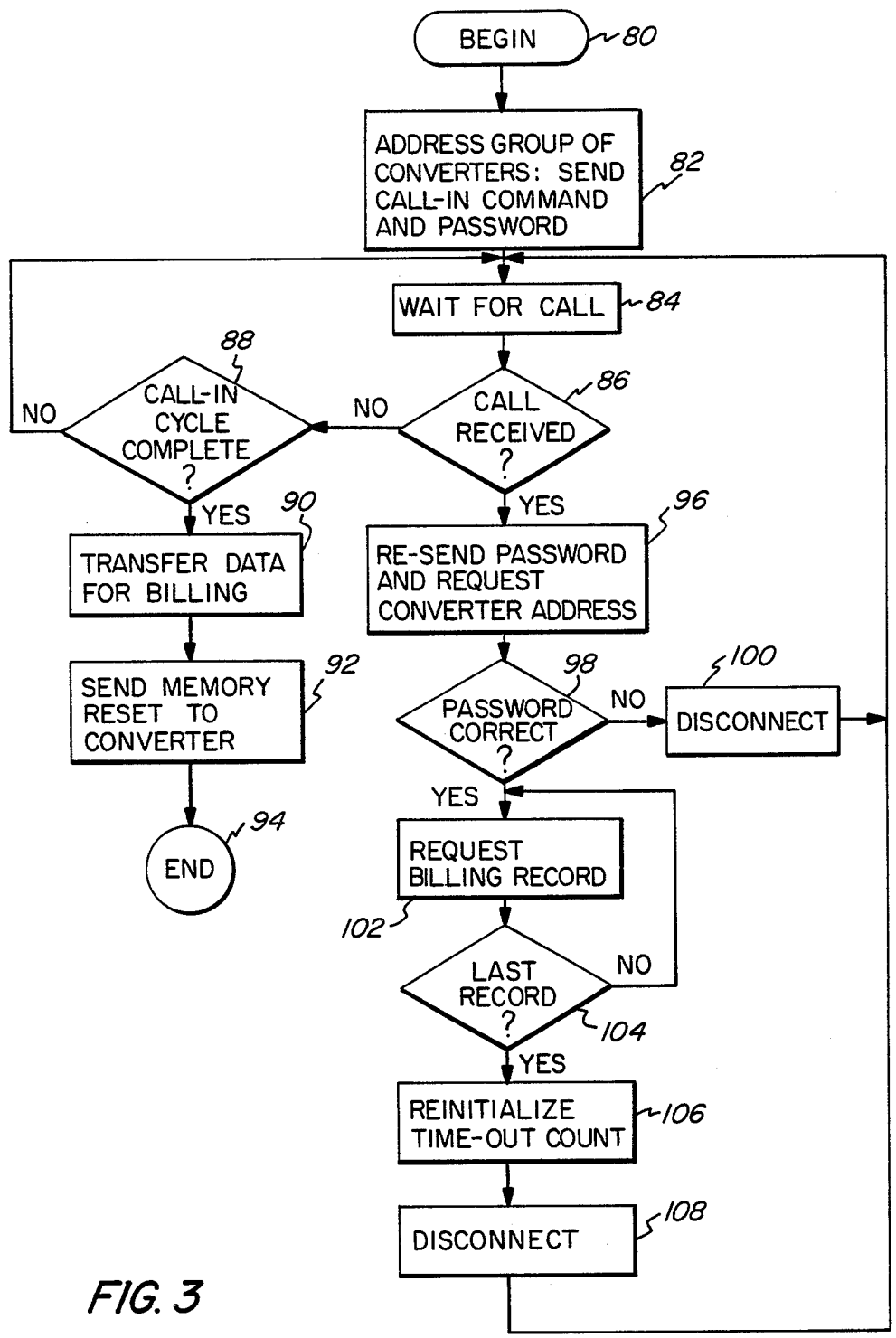
FIG. 3 is a flowchart illustrating the converter reporting and interrogation routine executed by the headend.

FIG. 3 is a flowchart illustrating the routine used by the headend to collect billing information from individual converters. The routine begins at box 80 and proceeds to box 82 where addressable controller 12 addresses a group of converters 32 via an FM data path on the CATV distribution system 10. The converters addressed by addressable controller 12 receive a call-in command and password. Telephone interface processor 16 then waits for calls from the converters 32 as indicated at box 84. If no call is received at box 86, and the call-in cycle is not yet complete as determined at box 88, the headend will continue to wait for a call at box 84 until such call is detected at box 86. Control will then pass to box 96 and telephone interface processor 16 will resend the current password to the converter and request the converter to send back its address. The converter will compare the password received from addressable controller 12 via the cable distribution system 10 and the password received from telephone interface processor 16 via the telephone communication path. If the passwords are not correct, box 98 will forward control to box 100 and the telephone call will be disconnected. The telephone interface processor will then wait for the next call at box 84. The purpose of verifying the password is to prevent a subscriber from connecting his converter to a home computer and clearing transactions or downloading authorizations.

If the passwords do match, control is passed from box 98 to box 102 and the telephone interface processor 16 requests the converter to send the first billing record. Box 104 determines if the record sent is the last record to be reported to the headend. If it is not the last record, control passes back to box 102 and the process continues until each billing record is transferred from the converter to the headend. After the last record is sent by the converter to the headend, control passes to box 106 and the telephone interface processor 16 transmits a signal to the converter to reinitialize its time-out count. The time-out count could alternately be reinitialized using a signal sent to the converter from addressable controller 12 via the CATV distribution system 10. Other instances in which the time-out count is reinitialized are when the converter responds to a headend query for the number of billing records that have not yet been sent and the answer is zero, when the headend instructs the converter to reset the time-out count via a specific command, when the headend tells the converter to reset the time-out count via a global system command, and when the converter is told to call-in to the headend to report its billing records but has no such records to report.

Once the time-out count is reinitialized at box 106, the telephone call is disconnected at box 108 and the headend waits for the next converter calling in at box 84. Once the call-in cycle is complete as detected at box 88, the billing data is transferred via addressable controller 12 to the headend billing computer 14 as indicated at box 90. Then, a memory reset signal is sent to the converter via the CATV distribution system 10 as indicated at box 92. The memory reset signal causes the converter to clear all billing records from its memory that have been sent to the headend for billing purposes. Then, the routine ends at box 94.

Figure 4A:
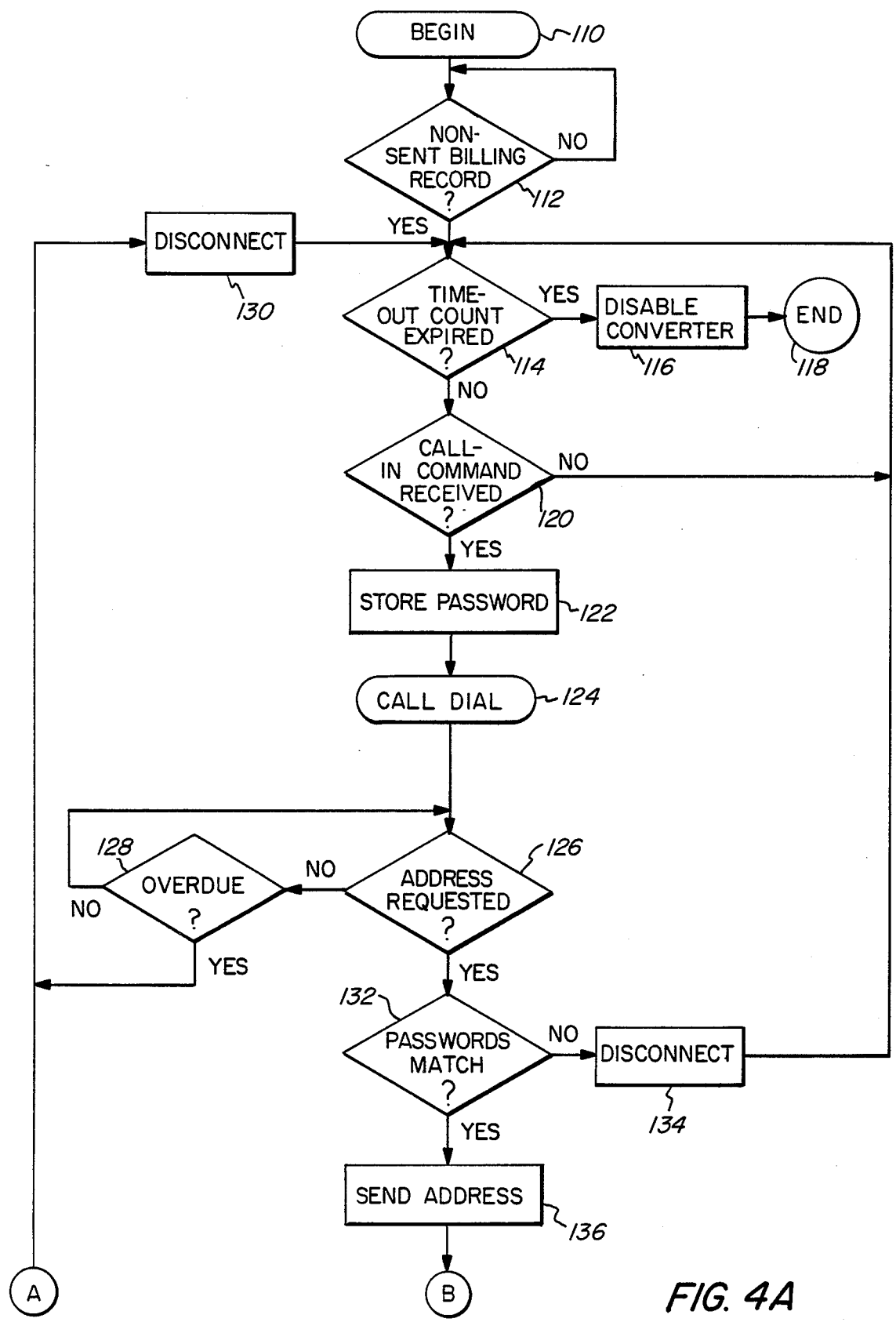
FIGS. 4A and 4B are flowcharts illustrating the converter reporting routine executed by the cable television converters.
Figure 4B:
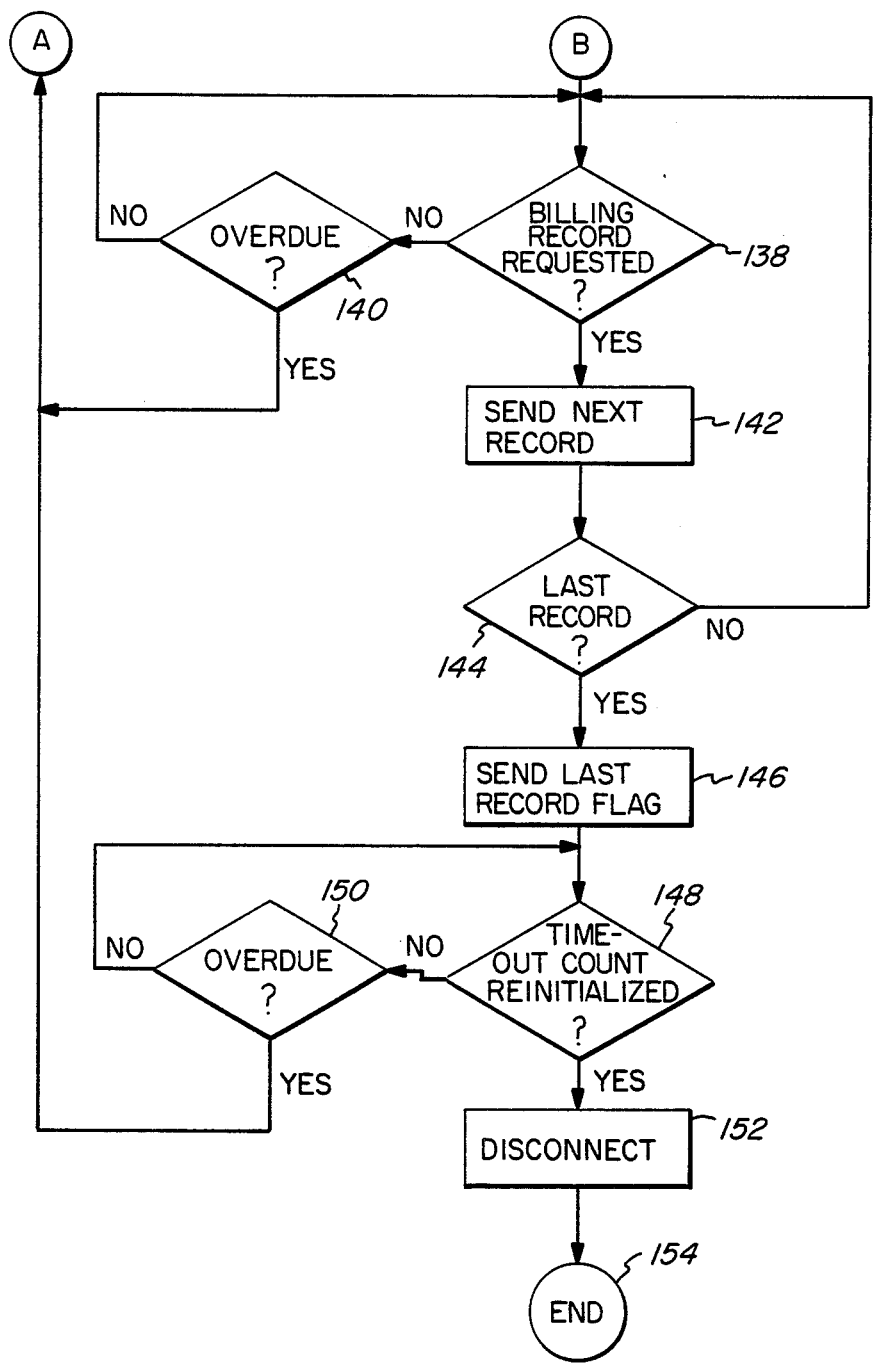

FIGS. 4A and 4B comprise a flowchart illustrating the routine used by the converter to report billing transactions to the headend. A single flowchart is provided by joining FIGS. 4A and 4B at points A and B. The routine begins at box 110 and control is passed to box 112 where a determination is made as to whether any non-sent billing records are currently stored in the converter memory. If not, the routine continues to loop through box 112 until a billing record has been stored.

When there are billing records to transmit to the headend, control passes to box 114 which determines if the converter time-out count has expired. If it has, the routine ends at box 118 after the converter has been disabled at box 116. Disabling the converter protects against theft of service should a user attempt to disconnect the converter from the telephone line so that it cannot report billing records to the headend. When in the time-out mode, the converter will not accept new authorization or connect commands from the headend. This prevents a terminal that has timed-out because it cannot report purchase transactions from being reauthorized by a cyclical update of authorization data from the headend. Thus, if a subscriber prevents the converter from reporting a purchase, either by unplugging it during collection periods or disconnecting the return path, the converter will disable itself. The period of time-out is set by the addressable controller 12 during initialization.

If the time-out count has not expired, control passes from box 114 to box 120 which determines whether a call-in command has been received from the headend via the FM data path of CATV distribution system 10. If not, control passes back to box 114 and the process continues until a call-in command is received. Once such command is received at box 120, control passes to box 122 and the password that accompanies the call-in command is stored in the converter. Then, at box 124, a "DIAL" routine is called. The DIAL routine is shown in flowchart form in FIG. 5 and will be described hereinbelow.

After a telephone communication path between the converter and the headend has been established by the DIAL routine, control passes to box 126 where the converter determines if the headend has requested its address. If not, control passes to box 128 which determines if the address request is overdue (i.e., has not arrived within a time period prescribed by an operational parameter downloaded during initialization of the converter). If the address request is overdue, a problem in the telephone communication path is indicated and control will pass from box 128 to box 130 where the call is disconnected so that it can be re-tried after the next call-in command is received.

If the address request is not overdue, control passes from box 128 back to box 126 until the address request arrives from the headend. Upon receipt of the address request, control passes to box 132 where a determination is made as to whether the password received via the FM data path and stored at box 122 matches the password sent by the telephone interface controller 16 with the address request. If the passwords do not match, the call is disconnected at box 134. If the passwords do match, control passes to box 136 and the converter sends its address to the headend via the established telephone communication path.

After the address is sent, control passes to box 138 and a determination is made as to whether the headend has requested the converter to send the first billing record. If not, a determination is made at box 140 as to whether the request for transmission of a billing record is overdue. If so, a problem in the telephone communication path is indicated and the call is disconnected at box 130. If the request for transmission of the billing record is not overdue, control passes back to box 138 and when the request arrives, control passes to box 142 at which point the converter sends the next billing record to the headend via the telephone communication path. If the record sent is not the last record, control is passed by box 144 back to box 138 and the process repeats until all billing records stored in the converter memory have been transmitted. At this point, control passes to box 146 and a "last record" flag is sent to the headend via the telephone communication path. Then, at box 148, the converter waits for the time-out count to be reinitialized by the headend. If the time-out count is overdue, control is passed from box 150 to box 130 where the call is disconnected due to an apparent problem in the telephone communication path. Otherwise, once the time-out count has been reinitialized, control passes to box 152 where the call is disconnected and the routine ends at box 154.

The DIAL routine illustrated by the flowchart of FIG. commences at box 160. Control passes to box 162 where the auto-dial and telephone interface circuit 70 of converter 32 (FIG. 2) determines whether an incoming ring signal is present on the subscriber's telephone line. If so, control is returned to the converter routine shown in FIG. 4A. The converter routine of FIG. 4A will find that the address request is overdue (since no telephone communication path has been established) and control will pass via box 130 of FIG. 4A to box 114 where the routine will try to place the call again when the next call-in command is received.

Figure 5:
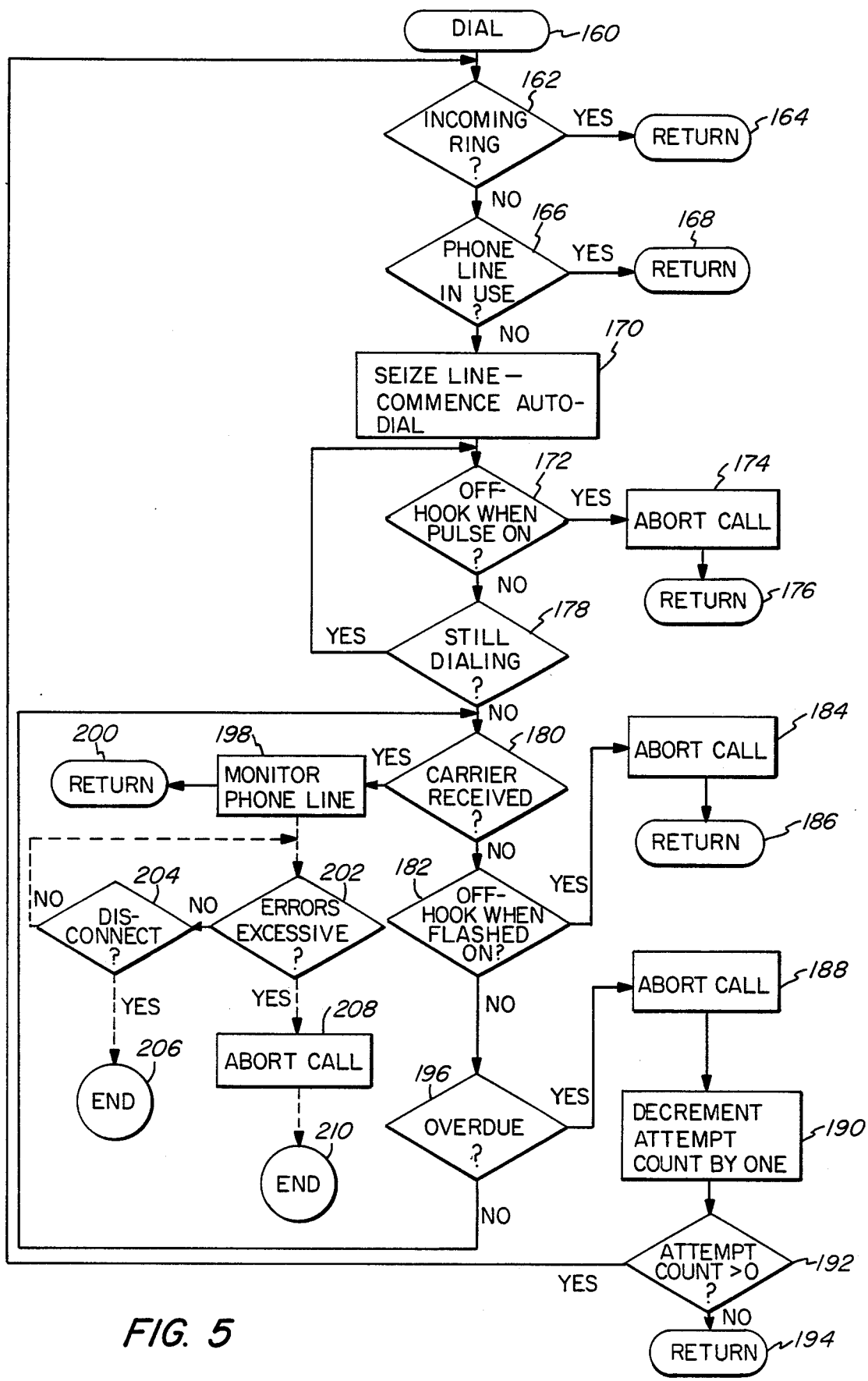
FIG. 5 is a flowchart illustrating the auto-dial routine for establishing a telephone communication path between a converter and the headend.

If, at box 162 in FIG. 5, an incoming ring is not detected on the subscriber's line, control will pass to box 166 where a determination is made as to whether the phone line is already in use. This determination is made by looking for a low D.C. voltage on the telephone line. If the voltage is present, the phone line is in use and control passes to box 168 where control is returned to the converter routine of FIG. 4A. If the subscriber's phone line is not in use, control passes to box 170 where the telephone line is seized and automatic dialing of the headend telephone number downloaded from the addressable controller is commenced. Conventional pulse dialing techniques are used so that at box 172, a determination can be made as to whether the subscriber has picked up his telephone line while the automatic dialing is in process. The auto-dial means detects whether an off-hook condition is present on the subscriber's telephone line when the auto-dial pulse dialing in progress is on-hook. If an off-hook condition is sensed at this point, the auto-dial means will know that the subscriber has picked up his telephone line and control will pass to box 174 where the telephone call being placed by the converter is aborted. Control then returns to the converter routine via box 176. The test made at box 172 continues throughout the automatic dialing cycle via box 178 until dialing is complete. Then, control passes to box 180 which determines whether a carrier has been received from the telephone interface processor 16 at the headend. Until a carrier is received, a test will be made at box 182 as to whether the subscriber has picked up his telephone line. This is achieved by flashing on-hook for approximately 10–20 milliseconds and detecting whether an off-hook condition is present on the telephone line. If so, it means the subscriber has picked up the line and the call attempt is aborted at box 184.

Control then returns to the converter routine at box 186.

Box 196 determines whether the receipt of the carrier from the headend is overdue. If so, the call is aborted at box 188, and a telephone call attempt count maintained by the converter is decremented by one at box 190. One of the operational parameters downloaded to the converter during initialization defines the number of times the converter should attempt to establish a telephone communication path with the headend before it gives up. If the attempt count is greater than zero at box 192, control loops back to box 162 and the DIAL routine continues. If the maximum number of attempts have been made, the attempt count will be zero and control will pass from box 192 to box 194 which returns control to the converter routine of FIG. 4A.

Once the carrier is received from the headend, control passes from box 180 to box 198 and the subscriber's phone line is monitored. Control then returns to the converter routine of FIG. 4A via box 200. During the time in which the telephone communication path is established, the autodial and telephone interface circuitry 70 will continue to monitor the subscriber's phone line to determine whether excessive data errors are present as indicated at box 202 in FIG. 5. If excessive errors are detected, it probably means that the subscriber has picked up his telephone in an attempt to place a call. In this instance, the call placed by the converter will be aborted at box 208 and the DIAL routine will end at box 210. If the errors are not excessive and the telephone communication path established by the converter is disconnected because it has been completed or otherwise interrupted, control will pass to box 206 where the DIAL routine is ended.

Figure 6:
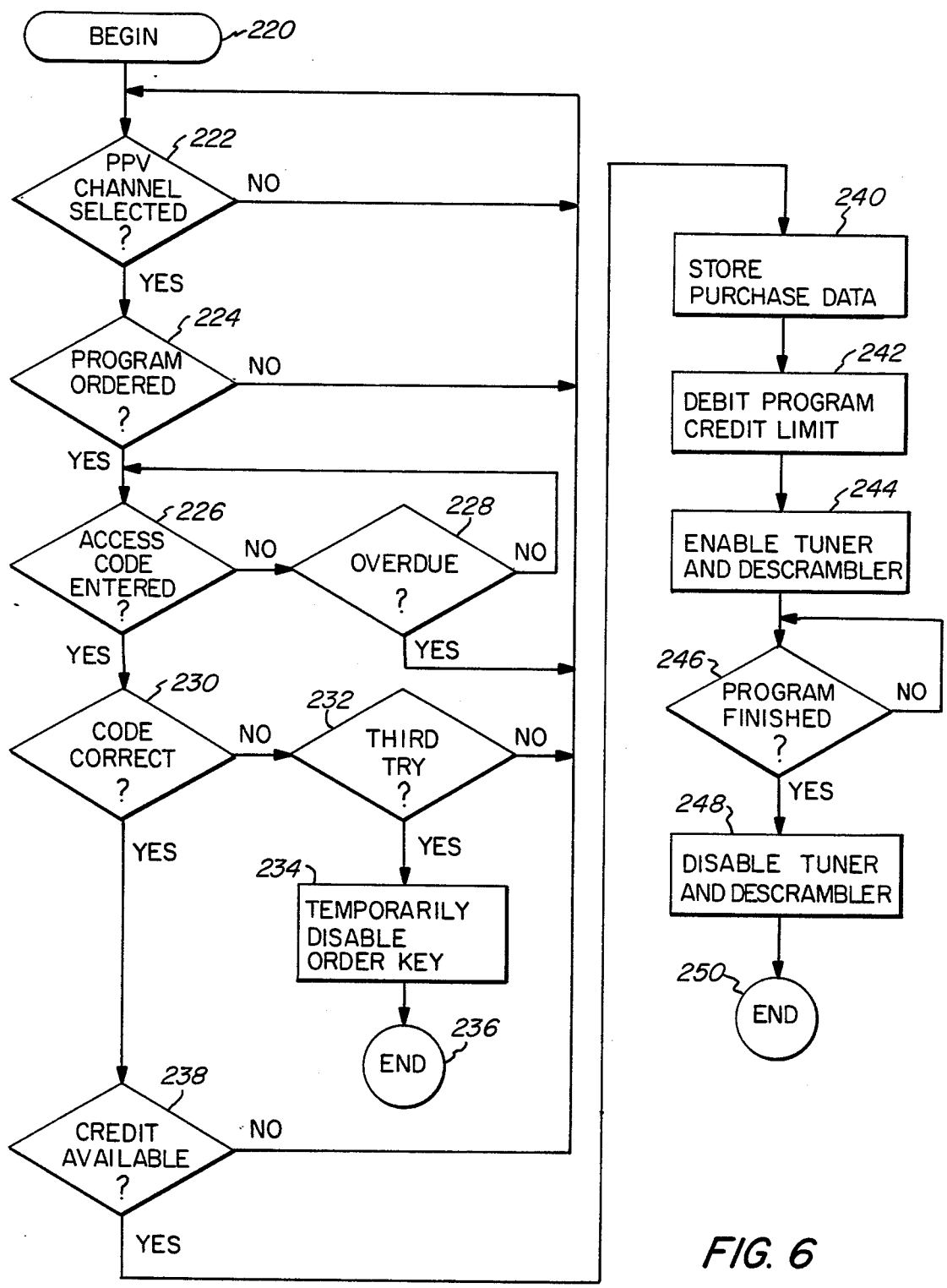
FIG. 6 is a flowchart illustrating the pay-per-view program ordering or transaction processing routine executed by a converter.

Turning now to FIG. 6, a flowchart is provided to illustrate the selection of a pay-per-view program by a subscriber. The routine begins at box 220 and passes to box 222 where the converter determines via microprocessor 58 whether the subscriber has tuned to a pay-per-view channel. If not, the routine continuously loops through box 222 until such a selection is made. Once a subscriber has tuned to a pay-per-view channel, control passes to box 224 to determine whether the subscriber orders the program on that channel for viewing. If not, control loops back to box 222. If a pay-per-view program is ordered, control passes to box 226 where the subscriber is expected to enter an access code. If the access code is not entered and is overdue, control passes back to box 222 via box 228. If the access code is entered, a determination is made at box 230 as to whether the code is correct. If not, and it is not the subscriber's third try to enter a correct access code, control passes back to box 222 via box 232. After three incorrect tries, control passes from box 232 to box 234 where the order key on the subscriber terminal is temporarily disabled to prevent an unauthorized user from seeking access to a pay-per-view program. The routine then ends at box 236.

Once a correct access code is entered by a subscriber, control passes from box 230 to box 238 to determine whether credit is available for viewing the program. Each converter is authorized by the headend for a maximum number of purchases. The effect of this function is to set a credit limit on the subscriber for the number of events that can be purchased. When a purchase is made, it is recorded as a billing record in the converter memory and the remaining credit limit is debited. The credit limit can be reset by the cable system operator via the addressable controller 12 on a periodic basis, e.g., monthly or alternately, after the collection of billing data from a converter has been completed.

It a determination is made at box 238 that credit is not available for the purchase, control passes hack to box 222. If credit is available, control passes to box 240 and the purchase data is stored as a billing record in the converter memory. The subscriber's program credit limit is then debited at box 242 and control passes to box 244 where the tuner and descrambler of the converter are enabled to allow the subscriber to view the program on his television. Once the pay-per-view program is finished as determined at box 246, control passes to box 248 where the tuner and descrambler are disabled from continuing to allow reception of the pay-per-view channel. The routine then ends at box 250.

It will now be appreciated that the present invention makes possible the implementation of impulse pay-per-view cable television service and other remotely accessible transactional services without incurring the cost of installing and maintaining a two-way distribution plant. The system uses a standard one-way addressable system for control functions and uses the public switched telephone network as a return recording path for the collection of billing information.

Data is collected from subscribers when the headend instructs a group of subscriber terminals (via the one-way cable data path) to call in if they have transactions to report. Terminals in the group with data begin to call in. If they cannot make a connection, they try again and continue to re-dial until they either make connection or a given period of time has elapsed.

A telephone interface processor at the headend answers calls via auto-answer modems to collect purchase data from subscribers. Data is stored in bulk in the telephone interface processor for later transfer to the headend computer. When the telephone interface processor has completed its communication with a subscriber terminal, it hangs up and answers the next call.

The headend computer interrogates the telephone interface processor to determine whether all subscriber terminals in the group have reported. When one cycle is complete, the headend initiates the next cycle.

The subscriber terminal store and forward system of the present invention offers a number of advantages over real-time transaction systems. For example, program purchase capability up to the last minute is available for an entire subscriber base, regardless of the size of the system. The system of the present invention is also able to survive a control system outage and continue to allow subscribers to purchase and complete transactions during the outage.

Although the present invention has been described in connection with a preferred embodiment, it will be appreciated that many modifications and adaptations thereto may be made without departing from the spirit and scope of the appended claims.

I claim:

1. Addressable television signal converter apparatus for providing impulse pay-per-view service on a cable television system or the like comprising:
   means for receiving a band of signals from a television signal transmission path including scrambled television program signals for viewing on a pay-per-view basis;
   data retrieval means coupled to said receiving means for retrieving converter data superimposed with said band of signals;

microprocessor means for processing converter data addressed thereto and retrieved by said data retrieval means;

tuner means coupled to said microprocessor and said receiving means for enabling a user to select a pay-per-view program and for descrambling the selected program for viewing by the user;

memory means coupled to said microprocessor for storing data indicative of pay-per-view programs selected by a user;

modem means for interfacing said microprocessor to a telephone line;

auto-dial means responsive to converter data retrieved by said data retrieval means from said band of signals and processed by said microprocessor for dialing a telephone number, thereby enabling said converter apparatus to establish a separate telephone communication path independent of said television signal transmission path over which the microprocessor can communicate with a remote computer via said modem;

means operatively associataed with said microprocessor for forwarding data stored in said meory means to a remote computer via a telephone communication path established by said auto-dial means;

means operatively associated with said microprocessor for maintaining a time-out count;

means for inhibiting the viewing of pay-per-view programs if the time-out count expires; and means for reinitializing said time-out count in response to an initialize signal received from a remote computer.

2. The apparatus of claim 1 further comprising:

means for storing pay-per-view program credits addressed to said microprocessor and retrieved by said data retrieval means;

means for debiting the stored program credits in response to the selection of a pay-per-view program by a user; and means for inhibiting the viewing of a pay-per-view program by a user if sufficient stored program credits are not available upon selection of the program.

3. The apparatus of claim 2 further comprising:

means for clearing said memory means in response to converter data comprising a memory reset command addressed to said microprocessor and retrieved by said data retrieval means.

4. The apparatus of claim 1 wherein said initialize signal is contained in converter data retrieved by said data retrieval means.

5. The apparatus of claim 1 wherein said initialize signal is contained in data received by said microprocessor via a telephone communication path established by said auto-dial means.

6. The apparatus of claim 1 further comprising:

means for inhibiting said auto-dial means from establishing a telephone communication path if said memory means does not contain any data indicative of a pay-per-view program selected.

7. The apparatus of claim 6 further comprising:

means for reinitializing said time-out count when said converter data comprises instructions requesting said auto-dial means to establish a telephone communication path and said memory means does not contain any data indicative of a pay-per-view program selected.

8. The apparatus of claim 1 further comprising:

means for enabling a user to input an access code prior to selecting a pay-per-view program;

means associated with said microprocessor for determining the validity of an access code entered by a user; and means for inhibiting the receipt of a pay-per-view program unless a valid access code has been entered by a user.

9. Addressable television signal converter apparatus for providing impulse pay-per-view service on a cable television system or the like comprising:

means for receiving a band of signals including scramble television program signals for viewing on a pay-per-view basis;

tuner means coupled to said receiving means for enabling a user to select a pay-per-view program for viewing;

memory means for storing data indicative of pay-per-view programs selected by a user via said tuner means;

modem means for interfacing said converter apparatus to a user's telephone line;

auto-dial means coupled to said modem means for seizing the user's telephone line and dialing a telephone number, thereby establishing a telephone communicatioan path over which the converter apparatus can communicate with a remote computer via said modem;

means operatively associated with said memory means and said modem for forwarding data stored in the memory means to a remote computer via a telephone communication path established by said auto-dial means;

said auto-dial means further comprising:

means for detecting an incoming ring signal on the user's telephone line; and means for preventing the auto-dial means from seizing the user's telephone line to dial a telephone number if an incoming ring signal is detected by said detecting means.

10. The apparatus of claim 9 wherein said auto-dial means further comprises:

means for determining if the user's telephone line is in use; and means for preventing the auto-dial means from seizing the user's telephone line to dial a telephone number if said determining means determines that the user's telephone line is already in use.

11. The apparatus of claim 9 wherein said auto-dial means utilizes pulse dialing and further comprises:

means for sensing an off-hook condition on the user's telephone line when the auto-dial means is in the process of dialing and the pulse dialing cycle is momentarily in an on-hook condition; and means for aborting the dialing process and releasing the user's telephone line if an off-hook condition is detected by said sensing means.

12. The apparatus of claim 10 wherein said auto-dial means further comprises:

means for flashing on-hook after completing the dialing of a telephone number and before establishing a telephone communication path with a remote computer; and means for releasing the user's telephone line if said sensing means senses an off-hook condition on the user's telephone line during an on-hook flash.

13. The apparatus of claim 9 wherein said auto-dial means further comprises:

means for detecting errors in data being received over a telephone communication path estabished by the auto-dial means; and means for aborting the telephone communication path and releasing the user's telephone line if the quantity of errors detected by the error detecting means is above a predetermined level.

14. The apparatus of claim 1 further comprising:

means for detecting if said auto-dial means fails in an attempt to establish a telephone communication path; and means for actuating said auto-dial means to make an additional attempt to establish a telephone communication path if a failed attempt is detected.

15. Apparatus for storing and forwarding billing information as to transactions completed using a remote subscriber terminal comprising:

input connector means for coupling the apparatus to a source of video signals;

a microprocessor coupled to receive data signals, including transaction credits, superimposed with video signals input to said connector means;

means for storing a plurality of transaction credits received by said microprocessor;

means coupled to said connector means for enabling a subscriber to selectively receive a video signal and thereby complete a billable transaction;

means operatively associated with said microprocessor for debiting stored transaction credits in response to the occurrence of a billable transaction;

means operatively associated with said microprocessor for preventing the completion of a billable transaction if sufficient stored transaction credits are not available for the transaction;

means for maintaining a record of completed billable transactions;

means operatively associated with said microprocessor for selectively accessing records of billable transactions from said maintaining means and transmitting the records on other than a real-time basis to a remote location in response to a command received from the remote location as a data signal superimposed with video signals input to said connector means;

means operatively associated with said microprocessor for maintaining a time-out count;

means for preventing the completion of a billable transaction if the time-out count expires; and means for re-initializing the time-out count in response to an initialize signal received from said remote location.

16. The apparatus of claim 15 wherein said record transmitting means establishes a telephone communication link between said microprocessor and the remote location for transmission of said records.

17. The apparatus of claim 15 further comprising:

means for clearing records from said record maintaining means after transmission of the records to the remote location.

18. The apparatus of claim 15 wherein said initialize signal is a data signal superimposed with video signals input to said connector means and received by said microprocessor.

19. The apparatus of claim 15 wherein said initialize signal comprises daa received by said microprocessor via a telephone communication link between the microprocessor and the remote location established by said record transmitting means.

20. The apparatus of claim 15 further comprising:

means for reinitializing the time-out count when said command signal is received from the remote location and said record maintaining means does not contain any records of completed billable transactions.

21. Headend apparatus for an impulse pay-per-view cable television service or the like comprising:

a television signal transmitter;

controller means for generating data signals containing telephone call-in instructions for each of a plurality of television signal converters and for interrogating television signal converters that have called in, to obtain billing data indicative of pay-per-view programs received by the converters;

means for storing billing data retrieved from said converters;

means for transmitting data signals from said controller means together with television signals output from said transmitter;

means for enabling said television converters to establish a separate telephone communication link independent from said television signal transmitter between said controller and a plurality of television signal conerters calling in via a telephone network in response to telephone call-in instructions transmitted by said transmitter;

means for detecting a power failure that impedes the operation of the apparatus;

means responsive to said power failure detecting means for maintaining billing data stored in said billing data storing means upon the occurence of a power failure; and means responsive to said power failure detecting means for directing a group of converters interrupted during a power failure to again call-in to resume interrogation after power is restored;

whereby two-way communication between the headend and a plurality of television signal converters can take place over a telephone network.

22. The apparatus of claim 21 wherein said communication link establishing means comprises a plurality of modems for coupling to a plurality of incoming telephone lines.

23. The apparatus of claim 22 wherein said modems are coupled to telephone lines configured in a hunting arrangement.

24. The apparatus of claim 21 wherein said controller means comprises:

means for successively directing different groups of converters to call-in for interrogation.

25. The apparatus of claim 21 wherein said call-in instructions comprise a telephone number, said apparatus further comprising:

means for enabling the telephone number included with call-in instructions to be selectively changed to a diagnostic call-in number; and means, coupled to respond to a call received on the diagnostic call-in number, for interrogatiang a television signal converter to obtain diagnostic data indicative of a malfunction in the converter.

26. A one-way cable television system for providing impulse pay-per-view service and the like comprising:

a cable television transmitter;

a plurality of addressable cable television convertes coupled to receive cable television signals from said transmitter;

headend controller means for generatiang data embodying instructions to be executed by converters together with address codes for directing said instructions to individual converters;

means for superimposing data and address codes from said controller means onto cable television signals output from said transmitter;

microprocessor means associated with each of said converters for executing instructions embodied in data addressed to the converter and received from said transmitter;

communication means associated with each of said converters and responsive to instructions embodied in data received by the converter via the transmitter for establishing a telephone communication path between the converter and the headend controller means;

means associated with each of said converters for maintaining a record of billable transactions completed by a user of the converter;

means for transferring daa from said record maintaining means to said headend controller via said telephone communication path;

means operatively associated with said microprocessor for maintaining a time-out count;

means for preventing the completion of a billable transaction if the time-out count expires; and means for reinitializing the time-out count in response to data received by the microprocessor from the headend controller.

27. The system of claim 26 wherein said headend controller means generates transaction credit data that is superimposed onto cable television signals together with address codes for forwarding the transaction credit data to individual converters, said apparatus further comprising:

means associated with each of said converters for storing transaction credit data addressed thereto;

means associated with each of said converters for debiting stored transaction credits in response to the completion of a billable transaction by a user of the converter; and means associated with each of said converters for preventing the completion of a billable transaction if sufficient stored transacton credits are not available for the transaction.

28. The system of claim 26 further comprising:

means for inhibiting said communication means from establishing a telephone communication path if said record maintaining means does not contain any records of billable transactions completed by a user.

29. A method for billing a subscriber of a pay-per-view television system on a non-real-time basis for billable programs viewed by the subscriber comprising the steps of:

receiving a scrambled television signal at a subscriber terminal from a headend;

selectively descrambling the received signal in response to subscriber action indicating acceptance for viewing of a program contained in the signal;

maintaining a time-out count in said subscriber teminal;

reinitializing said time-out count in response to a signal received from the headend;

preventing the descrambling of billable programs at the subscriber terminal if the time-out count expires;

maintaining a record at the subscriber terminal of billable programs accepted for viewing by a subscriber;

monitoring the signal received from the headend for a call-in command instructing the subscriber terminal to forward the record of billable programs to the headend;

establishing a telephone communication path between the subscriber terminal and the headend in response to the call-in command;

transmitting the record of billable programs to the headend over said telephone communication path; and billing the subscriber in accordance with the record of billable programs transmitted to the headend.

30. The method of claim 29 comprising the further steps of:

downloading a plurality of transaction credits from the headend to the subscriber terminal;

storing the downloaded transaction credits in the subscriber terminal;

debiting the stored transaction credits in response to the acceptance by a subscriber of a billable program for viewing; and preventing the descrambling of a program accepted by a subscriber if there are not sufficient stored transaction credits available to pay for the program.

31. The method of claim 29 wherein said headend sends a time-out reinitialize signal to the subscriber terminal upon receipt of the record of billable programs from the terminal.

32. The method of claim 29 comprising the further step of:

inhibiting the establishment of a telephone communication path and reinitializing the time-out count in response to a call-in command if there are no records of billable programs to report to the headend.

* * * * *